United States Patent
Kawakami et al.

(10) Patent No.: US 10,371,248 B2
(45) Date of Patent: Aug. 6, 2019

(54) OIL PASSAGE STRUCTURE FOR POWER TRANSMISSION DEVICE

(71) Applicant: TOYOTA JIDOSHA KABUSHIKI KAISHA, Toyota-shi, Aichi-ken (JP)

(72) Inventors: Takaho Kawakami, Susono (JP); Motoki Tabuchi, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/729,161

(22) Filed: Oct. 10, 2017

(65) Prior Publication Data
US 2018/0106359 A1 Apr. 19, 2018

(30) Foreign Application Priority Data
Oct. 14, 2016 (JP) ................. 2016-202759

(51) Int. Cl.
| F16H 57/04 | (2010.01) |
| F16H 48/08 | (2006.01) |
| F16H 57/02 | (2012.01) |
| B29C 43/00 | (2006.01) |
| F16H 57/032 | (2012.01) |
| F16H 61/00 | (2006.01) |

(52) U.S. Cl.
CPC ......... F16H 57/0423 (2013.01); F16H 48/08 (2013.01); F16H 57/04 (2013.01);
(Continued)

(58) Field of Classification Search
CPC .. F16H 57/04; F16H 57/0423; F16H 57/0457; F16H 57/0471; F16H 57/0483;
(Continued)

(56) References Cited

U.S. PATENT DOCUMENTS

| 4,242,923 A * | 1/1981 | Nishikawa | B60K 17/08 184/6.12 |
| 7,472,562 B2 * | 1/2009 | Abe | F04C 29/026 417/313 |

(Continued)

FOREIGN PATENT DOCUMENTS

| FR | 2990738 A1 | 11/2013 |
| JP | H09-26018 A | 1/1997 |

(Continued)

OTHER PUBLICATIONS

U.S. Appl. No. 15/728,538, filed Oct. 10, 2017, 41 pages.

*Primary Examiner* — Leslie A Nicholson, III
(74) *Attorney, Agent, or Firm* — Hunton Andrews Kurth LLP (57) ABSTRACT

In an oil passage structure for a power transmission device including a case provided to accommodate a power transmission device, a baffle plate attached to an inner wall of the case, and an oil pump, the oil passage structure includes a supply oil passage through which oil is pumped from the oil pump to an oil supply destination via the baffle plate. A plate oil passage, which constitutes a portion of the supply oil passage, a supply port, which allows the oil discharged from the oil pump to flow into the plate oil passage through the supply port, and a first discharge port, which allows the oil supplied to the oil supply destination to be discharged through the first discharge port, are formed in the baffle plate.

12 Claims, 7 Drawing Sheets

(52) U.S. Cl.
CPC ..... *F16H 57/0457* (2013.01); *F16H 57/0471* (2013.01); *F16H 57/0483* (2013.01); *B29C 43/00* (2013.01); *F16H 57/032* (2013.01); *F16H 57/0445* (2013.01); *F16H 57/0446* (2013.01); *F16H 2057/02091* (2013.01); *F16H 2057/02095* (2013.01); *F16H 2061/0037* (2013.01)

(58) Field of Classification Search
CPC ............... F16H 57/032; F16H 57/0445; F16H 57/0446; F16H 2057/02091; F16H 2057/02095; F16H 2061/0037; F16H 48/08; B29C 43/00
USPC ....................................................... 475/160
See application file for complete search history.

(56) References Cited

U.S. PATENT DOCUMENTS

| | | | | |
|---|---|---|---|---|
| 8,122,787 | B2* | 2/2012 | Simpson | F16H 57/0423 74/606 R |
| 8,653,704 | B2* | 2/2014 | Atarashi | B60K 6/405 310/52 |
| 9,103,432 | B2* | 8/2015 | Isomura | F16H 57/0423 |
| 9,435,421 | B2* | 9/2016 | Mafune | F16H 57/0409 |
| 9,528,593 | B2* | 12/2016 | Tage | F16H 57/0423 |
| 9,638,313 | B2* | 5/2017 | Steward | F16H 57/0423 |
| 9,829,050 | B2* | 11/2017 | Shimazaki | F16D 13/74 |
| 2006/0179973 | A1* | 8/2006 | Matsufuji | F16H 57/0447 74/606 R |
| 2011/0298314 | A1* | 12/2011 | Atarashi | B60K 6/405 310/54 |
| 2016/0033028 | A1* | 2/2016 | Tage | F16H 57/0423 475/160 |
| 2016/0076636 | A1 | 3/2016 | Kito et al. | |
| 2017/0009872 | A1 | 1/2017 | Matsubara | |
| 2017/0030457 | A1* | 2/2017 | Hotait | F16H 57/0423 |

FOREIGN PATENT DOCUMENTS

| | | |
|---|---|---|
| JP | 2015-190499 A | 11/2015 |
| JP | 2016-041979 A | 3/2016 |
| JP | 2016121810 A | 7/2016 |

* cited by examiner

OIL PASSAGE STRUCTURE FOR POWER TRANSMISSION DEVICE

INCORPORATION BY REFERENCE

The disclosure of Japanese Patent Application No. 2016-202759 filed on Oct. 14, 2016 including the specification, drawings and abstract is incorporated herein by reference in its entirety.

BACKGROUND

1. Technical Field

The present disclosure relates to an oil passage structure for a power transmission device.

2. Description of Related Art

Lubrication-needing sites that need lubrication using oil, such as engagement parts of gears and bearings, are provided inside a case provided to accommodate a power transmission device. As methods of supplying oil to the lubrication-needing sites, a method of pumping oil with an oil pump and oil passages, and a method (scooping lubrication) of scooping oil with a differential ring gear of a differential gear mechanism are known.

Japanese Unexamined Patent Application Publication No. 09-026018 (JP 09-026018 A) discloses, as the method of pumping oil, connecting a supply pipe to oil passages formed in a case and installing the supply pipe inside the case to directly supply oil from the supply pipe to the lubrication-needing sites.

Japanese Unexamined Patent Application Publication No. 2016-41979 (JP 2016-41979 A) discloses providing a baffle plate inside a case, which suppresses scattering of lubricating oil when oil is scooped by the differential ring gear of the differential gear mechanism, as a configuration in which oil is scooped to lubricate.

SUMMARY

However, in the configuration described in JP 09-026018 A, the supply pipe should be installed so as to avoid elements provided inside the case. For example, in a case where the differential gear mechanism is used as a portion to which an oil is supplied, the supply pipe is installed so as to bypass the baffle plate described in JP 2016-41979 A. In this way, in the configuration in which the supply pipe is provided inside the case, there is a possibility that oil passage length may become long and the pressure loss of oil may become large.

The disclosure provides an oil passage structure for a power transmission device where the pressure loss of oil can be reduced.

An aspect of the disclosure relates to an oil passage structure for a power transmission device, the oil passage structure including a case provided to accommodate the power transmission device; a baffle plate attached to an inner wall of the case; an oil pump; and a supply oil passage through which oil is pumped from the oil pump to an oil supply destination via the baffle plate. The baffle plate has a plate oil passage, a supply port, and a discharge port. The plate oil passage is an oil passage that constitutes a portion of the supply oil passage. The supply port is configured to allow the oil discharged from the oil pump to flow into the plate oil passage through the supply port. The discharge port is configured to allow the oil supplied to the oil supply destination, to be discharged from the plate oil passage through the discharge port.

According to the aspect, oil can be pumped via the oil passage provided in the baffle plate. For that reason, unlike the related art, there is no need for installing a supply pipe so as to bypass the baffle plate. Accordingly, it is possible to make the oil passage length of the supply oil passage shorter than that of an oil passage that bypasses the baffle plate, and the pressure loss of oil caused by the oil passage, a length of which is long, can also be reduced.

In the oil passage structure according to the aspect, the oil supply destination includes a first oil supply destination and a second oil supplied portion at different positions inside the case. The discharge port may include a first discharge port that allows the oil supplied to the first oil supply destination to be discharged through the first discharge port, and a second discharge port that allows the oil supplied to the second oil supply destination to be discharged through the second discharge port. The plate oil passage may branch to an oil passage that leads from the supply port to the first discharge port, and an oil passage that leads from the supply port to the second discharge port.

According to the aspect, oil can be supplied to a plurality of oil supply destinations by the plate oil passage formed in the baffle plate. Accordingly, there is no need for providing a supply pipe for each oil supply destination, and the number of parts can be reduced.

In the oil passage structure according to the aspect, the plate oil passage may be an oil passage that allows the oil to be supplied through the oil passage to a lubrication-needing portion where lubrication by the oil is needed in the power transmission device. The first oil supply destination may be a constituent element of a differential gear mechanism included in the power transmission device. The second oil supply destination may be a constituent element separate from the differential gear mechanism in the power transmission device. The first discharge port may be provided at a position where oil is directly supplied to the first oil supply destination. The second discharge port may be provided at a position where oil is directly supplied to the second oil supply destination.

According to the aspect, oil can be supplied to the differential gear mechanism by the plate oil passage, and oil can be supplied to the constituent element disposed on the axis different from the differential gear mechanism.

In the oil passage structure according to the aspect, the oil supply destination may further include a third oil supply destination that is a differential pinion gear and a differential side gear that constitute the differential gear mechanism. The discharge port may further include a third discharge port provided at a position where oil is directly supplied to the third supplied portion. The plate oil passage may branch to an oil passage that leads from the supply port to the first discharge port, and an oil passage that leads from the supply port to the third discharge port. The first oil supply destination may be a differential bearing that supports a differential case accommodating the differential pinion gear and the differential side gear on the case. The baffle plate may be disposed so as to cover the differential case.

According to the aspect, the baffle plate is provided with the plate oil passage supplied to the oil supply destination and the discharge ports provided in respectively different lubrication-needing portions. Therefore, lubricating oil can be easily supplied to elements that run short of lubricating oil. Moreover, the number of oil passages can be reduced while compensating for the shortage of lubricating oil in the lubrication-needing portions. For that reason, the manufacturing costs can be suppressed.

In the oil passage structure according to the aspect, the plate oil passage may be a lubricating oil passage that allows oil to be supplied through the lubricating oil passage to a constituent element of a differential gear mechanism included in the power transmission device, and an oil passage that allows hydraulic pressure of oil to be supplied through the oil passage to a hydraulic actuator included in the power transmission device. The baffle plate may be provided on an axis where the differential gear mechanism is disposed. The first oil supply destination may be a constituent element of the differential gear mechanism. The second oil supply destination may be the hydraulic actuator. The first discharge port may be provided at a position where oil is directly supplied to the first oil supply destination.

According to the aspect, the portion to which oil is supplied via the supply oil passage may include both the lubrication-needing portions and the hydraulic actuator. Accordingly, the application range of the baffle plate can be expanded.

In the oil passage structure according to the aspect, a direction in which the supply port opens may be a direction opposite to a direction in which the first discharge port opens.

In the oil passage structure according to the aspect, a direction in which the supply port opens may be the same as a direction in which the second discharge port opens.

In the oil passage structure according to the aspect, the plate oil passage may be an oil passage that passes through the inside of the baffle plate.

According to the aspect, since the plate oil passage passes through the inside of the baffle plate, a space for installing the supply pipe can be reduced. Additionally, since the supply pipe can be reduced, the power transmission device can be reduced in weight.

In the oil passage structure according to the aspect, the baffle plate may have a second plate oil passage that is an oil passage independent from the plate oil passage, the second plate oil passage allowing oil to be pumped through the second plate oil passage to an oil supply destination different from the oil supply destination via the plate oil passage.

According to the aspect, oil can be pumped to a plurality of oil supply destinations by the independent plate oil passages formed in the baffle plate. Accordingly, there is no need for providing a supply pipe for each oil supply destination, and the number of parts can be reduced.

In the oil passage structure according to the aspect, the baffle plate may include a plate-shaped plate body and a tubular member integrated with the plate body. The plate oil passage may be an oil passage formed by the tubular member.

According to the aspect, since the baffle plate in which the plate body and the tubular member are integrated with each other is used, a space for installing the supply pipe can be reduced. Additionally, since the plate oil passage is formed by the tubular member, a flow passage cross-section of the plate oil passage has a circular shape. Accordingly, the pressure loss of oil that flows through the inside of the tubular member can be reduced.

In the oil passage structure according to the aspect, the power transmission device may include a transmission, a counter gear mechanism, and a differential gear mechanism. The oil pump may be a mechanical oil pump in which engine torque is transmitted to the power transmission device via the transmission and is driven. The plate oil passage may be provided so as to pass between a rotary shaft of the transmission and a rotary shaft of the differential gear mechanism.

In the oil passage structure according to the aspect, the power transmission device may include a transmission, a counter gear mechanism, and a differential gear mechanism. The plate oil passage may be provided so as to pass between a rotary shaft of the counter gear mechanism and a rotary shaft of the differential gear mechanism.

In the oil passage structure according to the aspect, the baffle plate may have a tubular part, and a flange part that extends radially outwardly from the tubular part. The plate oil passage may extend in a circumferential direction of the baffle plate. The discharge port may be provided at a position, which is different in the circumferential direction of the baffle plate from a position at which the supply port is provided, such that oil is supplied to the oil supply destination.

In the disclosure, oil can be pumped via the oil passage provided in the baffle plate. Accordingly, it is possible to make the oil passage length of the supply oil passage shorter than that of an oil passage that bypasses the baffle plate, and the pressure loss of oil caused by the oil passage length can also be reduced.

BRIEF DESCRIPTION OF THE DRAWINGS

Features, and advantages, and technical and industrial significance of exemplary embodiments will be described below with reference to the accompanying drawings, in which like numerals denote like elements, and wherein.

DETAILED DESCRIPTION OF EMBODIMENTS

Hereinafter, oil passage structures of power transmission devices in embodiments of the disclosure will be specifically described with reference to the drawings.

First Embodiment

1. Overall Configuration

Figure 1:
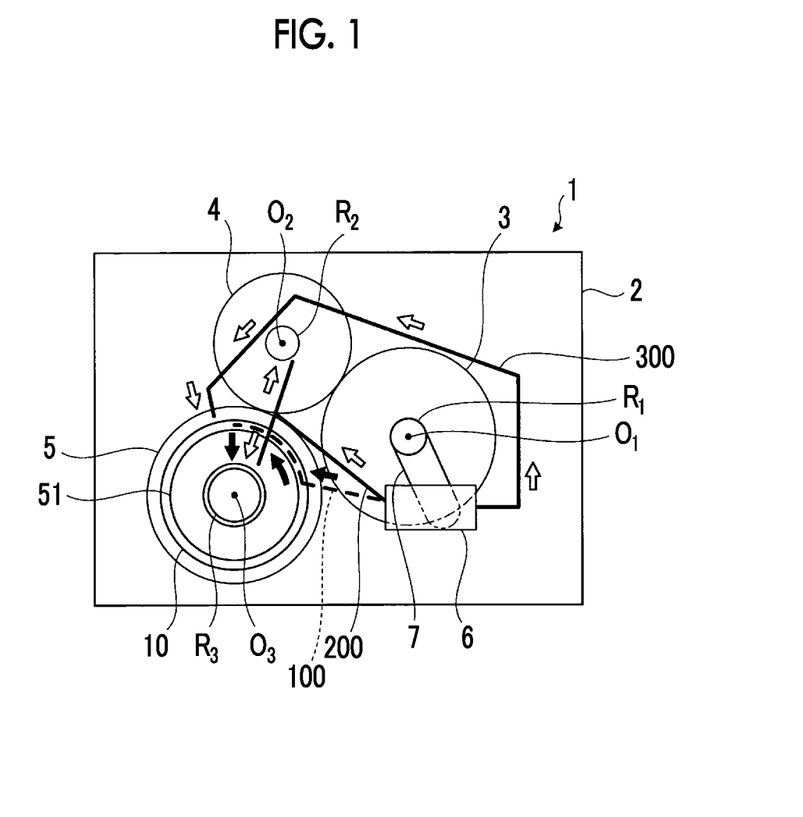
FIG. 1 is a schematic view for illustrating an oil passage structure for a power transmission device in a first embodiment.

FIG. 1 is a schematic view for illustrating an oil passage structure for a power transmission device in a first embodiment. In addition, for convenience of description, oil passages (a supply pipe 300 of the related art, an oil passage 200 that is the shortest path), which are not included in the embodiment, are illustrated in FIG. 1.

1-1. Power Transmission Device

A power transmission device 1 is a mechanism that is mounted on a vehicle in a state where the power transmission device is accommodated in a case 2 and that transmits the power, which is output from an engine, to the driving wheels. The power transmission device 1 illustrated in FIG. 1 is mounted on a front engine front drive type vehicle (FF vehicle), and includes a transmission 3, a counter gear mechanism 4, and a differential gear mechanism 5, which are accommodated in the case 2. That is, the case 2 is a transaxle case (T/A case) that accommodates the transmission 3 and the differential gear mechanism 5. In the power transmission device 1, power is transmitted from the transmission 3 to the differential gear mechanism 5 via the counter gear mechanism 4 on a power transmission path that leads from the engine to the driving wheels.

In detail, the power transmission device 1 has a plurality of rotary shafts.

A first shaft $R_1$, a second shaft $R_2$, and a third shaft $R_3$, which constitute the power transmission device 1, are provided inside the case 2. The transmission 3 is provided on the first shaft $R_1$ on the same axis as the engine, and includes an input shaft and an output gear having a first axis $O_1$ as a rotation center. For example, the transmission 3 is constituted of a planetary gear mechanism. The counter gear mechanism 4 is provided on the second shaft $R_2$. The differential gear mechanism 5 is provided on the third shaft $R_3$, and has the right and left driving wheels (front wheels) connected thereto via a driving shaft. That is, the input shaft of the transmission 3 is included in the first shaft $R_1$, a countershaft 41 (illustrated in FIG. 3) of the counter gear mechanism 4 is included in the second shaft $R_2$, and the driving shaft is included in the third shaft $R_3$. In the description, an axis center of the first shaft $R_1$ is described as the first axis $O_1$, an axis center of the second shaft $R_2$ is described as the second axis $O_2$, and an axis center of the third shaft $R_3$ is described as a third axis $O_3$.

Additionally, a baffle plate 10, which restricts a flow direction of oil around the third axis $O_3$, and a differential case 51 of the differential gear mechanism 5 are provided inside the case 2. The baffle plate 10 is disposed outside the differential case 51 around the differential gear mechanism 5 that is an oil supply destination. In addition, a detailed structure of the baffle plate 10 will be described below.

Moreover, a mechanical oil pump 6 driven by the engine is provided as an oil supply source inside the case 2. The mechanical oil pump 6 is disposed on a separate shaft from the first shaft $R_1$, and is connected so as to be capable of transmitting the torque of the first shaft $R_1$ via a power transmission device 7, such as a chain mechanism. In addition, the mechanical oil pump 6 may be provided on the same axis as the first axis $O_1$.

1-2. Oil Passage Structure

Here, the oil passage structure of the embodiment will be compared with a related art structure. First, the supply pipe 300 of the related art structure is installed so as to bypass the outside of the differential case 51 in order to supply oil from the mechanical oil pump 6 to the differential gear mechanism 5. Additionally, since the differential gear mechanism 5 is provided on the third shaft $R_3$, the supply pipe 300 extends up to the periphery of the third shaft $R_3$ so as to bypass the outside of the first shaft $R_1$ and the second shaft $R_2$ and run along a wall surface of the case 2. For that reason, in the supply pipe 300 of the related art, oil passage length becomes longer, and the pressure loss of oil caused by the oil passage length becomes larger. Thus, in order to shorten the oil passage length, it is considered that an oil passage (hereinafter referred to as a "shortest oil passage") 200 of the shortest path is formed.

The shortest oil passage 200 becomes a path that is linear in its entirety from the mechanical oil pump 6 toward the differential gear mechanism 5. However, many elements (peripheral members) such as bearings and reinforcing ribs are present around the oil supply destination, and the structure is complicated. For that reason, it is difficult to realize the shortest oil passage 200 by providing a discharge port at a position where oil can be supplied to the oil supply destination and connecting the linear oil passage so as to connect the position of the discharge port and the mechanical oil pump 6 together. Then, it is considered that the linear oil passage is connected so as to avoid the peripheral members. In this case, however, a right-angled curve in which the oil passage is steeply curved is formed, and thus, the pressure loss of oil caused by an oil passage shape becomes larger. Thus, a supply oil passage 100 of the present embodiment is configured so as to provide a curvilinear oil passage around the oil supply destination to reduce the pressure loss of oil caused by the oil passage shape and to realize a path closer to the shortest oil passage 200 than the supply pipe 300 of the related art to reduce the pressure loss caused by the oil passage length.

The supply oil passage 100 of the first embodiment is configured such that oil is pumped from the mechanical oil pump 6 to the differential gear mechanism 5 via the cylindrical baffle plate 10. The baffle plate 10 is a baffle plate with an oil passage in which the oil passage extending in a circumferential direction within a plate is formed. Additionally, the baffle plate 10 is disposed around the oil supply destination. For that reason, in the supply oil passage 100, it is possible to pump oil using the oil passage extending in the circumferential direction inside the baffle plate 10 around the oil supply destination. That is, the oil passage extending in the circumferential direction around the oil supply destination is constituted of the baffle plate 10 that is a peripheral member of the oil supply destination. Accordingly, the pressure loss of oil caused by the oil passage shape can be reduced. Additionally, the supply oil passage 100 becomes a path closer to the shortest oil passage 200 than the supply pipe 300 of the related art. As illustrated in FIG. 1, as seen from an axial direction, the supply pipe 300 is provided outside the rotary shafts (the first shaft $R_1$, the second shaft $R_2$, and the third shaft $R_3$). However, the supply oil passage 100 is provided so as to pass between the first shaft $R_1$ inside the rotary shafts, that is, on the oil supply source side, and the third shaft $R_3$ on the oil supply destination side (and further between the second shaft $R_2$ and the third shaft $R_3$). For this reason, the oil passage length of the supply oil passage 100 becomes shorter than the oil passage length of the supply pipe 300. Accordingly, the pressure loss of oil caused by the oil passage length can be reduced.

2. Arrangement of Baffle Plate and Oil Supply Destination

Figure 2:
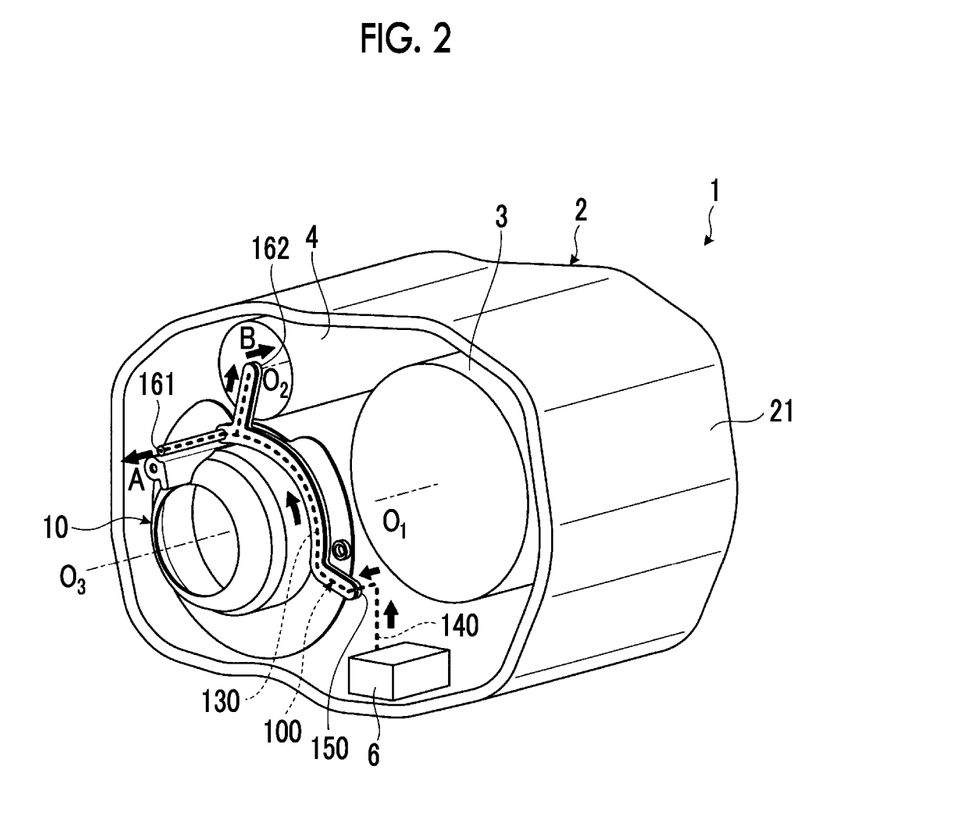
FIG. 2 is a schematic view for illustrating the arrangement of a baffle plate.
Figure 3:
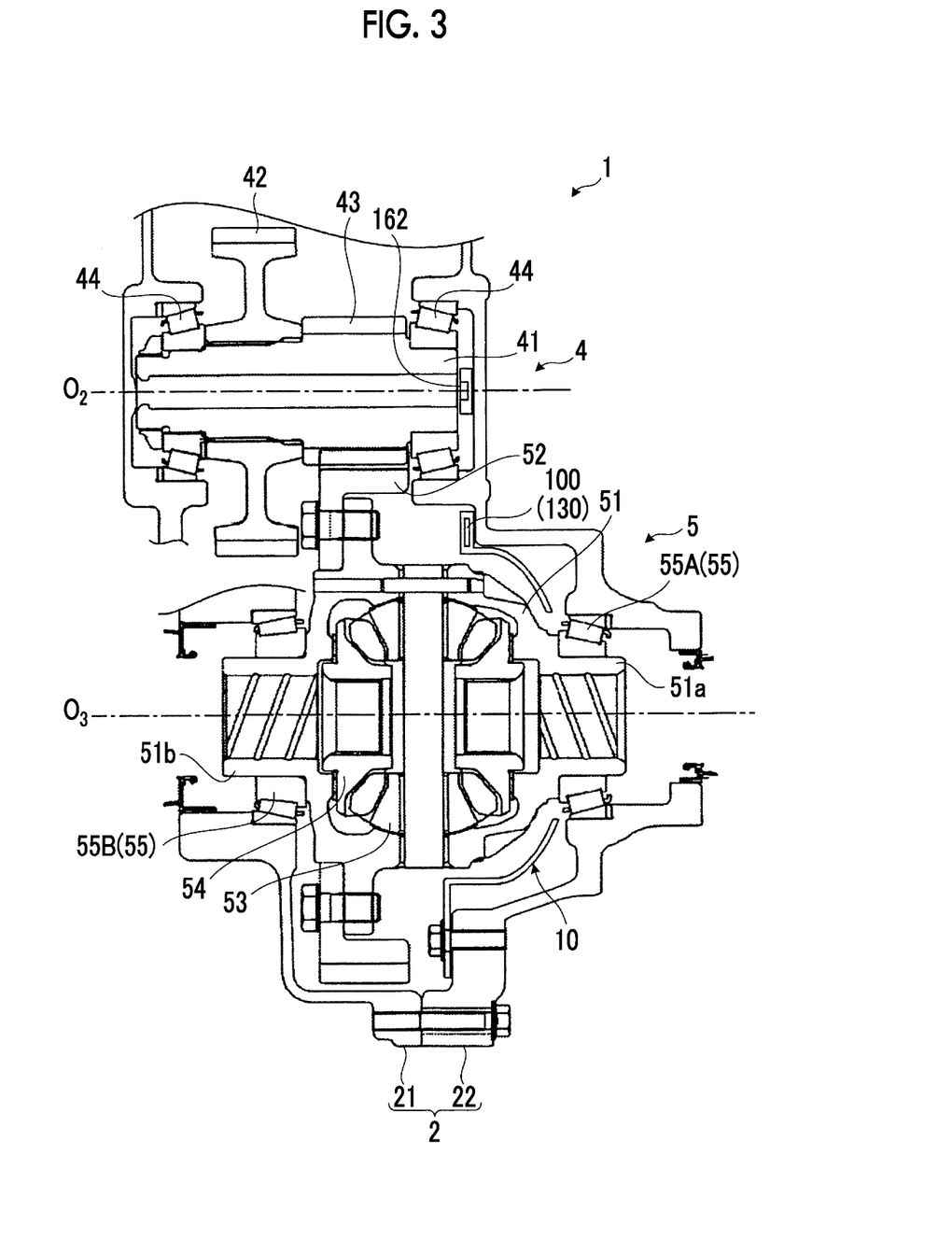
FIG. 3 is a sectional view schematically illustrating an internal structure of a case.

The arrangement of the baffle plate 10 and the oil supply destination will be described with reference to FIG. 2 and FIG. 3. FIG. 2 is a schematic view for illustrating the arrangement of the baffle plate 10. FIG. 3 is a sectional view schematically illustrating an internal structure of the case 2. In addition, the differential gear mechanism 5 is not illustrated in FIG. 2, and a portion of the case 2 is illustrated.

2-1. Arrangement of Baffle Plate

The baffle plate 10 is disposed around the third axis $O_3$ inside the case 2, and is formed in a tubular shape having a predetermined length in the axial direction. Additionally, as illustrated in FIG. 3, the baffle plate 10 is a fixing member attached to an inner wall of the case 2, and is disposed between the differential case 51 and the case 2. The differential gear mechanism 5 including the differential case 51 is the oil supply destination. That is, the baffle plate 10 is attached to the inner wall of the case 2 around the oil supply destination.

The case 2 includes a tubular main case body 21 that accommodates the transmission 3, and two cover members 22 attached to the openings on both sides of the main case body 21. As illustrated in FIG. 3, the main case body 21 and the cover members 22 are fastened with a bolt and integrated with each other. In an example illustrated in FIG. 3, the cover member 22 is a front cover disposed on the engine side in the axial direction, and the baffle plate 10 is fastened to an inner wall of the cover member 22 with a bolt. In addition, in a case where the main case body 21 and the cover member 22 are not particularly distinguished from each other, the main case body 21 and the cover member 22 are described as the case 2.

2-2. Oil Supply Destination

As illustrated by dashed lines in FIG. 2, the supply oil passage 100 is constituted of a path through which oil is pumped from the mechanical oil pump 6 driven by the engine to oil supply destinations via the baffle plate 10. In detail, the supply oil passage 100 includes a plate oil passage 130 that passes through the inside of the baffle plate 10 and extends in the circumferential direction of the third axis $O_3$, and a case oil passage 140 that is an oil passage formed in the case 2. That is, a portion of the supply oil passage 100 is provided in the baffle plate 10. The case oil passage 140 constitutes the supply oil passage 100 between the mechanical oil pump 6 and the plate oil passage 130. Since the plate oil passage 130 on a downstream side and the case oil passage 140 on an upstream side communicate with each other, oil can be pumped from the mechanical oil pump 6 to the oil supply destinations. Moreover, a supply port 150 to which oil is supplied from the case oil passage 140, a first discharge port 161 for discharging oil to a first supply destination A that is an oil supply destination on the third axis $O_3$, and the second discharge port 162 for discharging oil to a second supply destination B that is an oil supply destination on the second axis $O_2$ are formed in the baffle plate 10.

The supply port 150 is a connection port connected to the case oil passage 140, and communicates with the plate oil passage 130. Additionally, all the supply port 150, the first discharge port 161, and the second discharge port 162 are provided at positions that are different from each other in the circumferential direction of the baffle plate 10. The plate oil passage 130 communicates with the supply port 150 and the first discharge port 161, and communicates with the supply port 150 and the second discharge port 162. Accordingly, the oil, which has flowed into the plate oil passage 130 (into the baffle plate 10) from the supply port 150, flows through the plate oil passage 130 in the circumferential direction, and is discharged to different oil supply destinations (the first supply destination A and the second supply destination B) from the first discharge port 161 and the second discharge port 162. That is, the supply oil passage 100 can supply oil to the oil supply destinations disposed on the different shafts via the baffle plate 10.

As illustrated in FIG. 3, the oil supply destinations of the supply oil passage 100 include a differential bearing 55 (the first supply destination A) that supports the differential case 51 on the same shaft as the baffle plate 10, the counter gear mechanism 4 (the second supply destination B) disposed on a separate shaft from the baffle plate 10, and a differential pinion gear 53 and a differential side gear 54 (a third supply destination C illustrated in FIGS. 5 and 8 to be described below) provided inside the differential case 51 on the same shaft as the baffle plate 10.

In detail, the differential gear mechanism 5 includes the differential case 51, a differential ring gear 52 that rotates integrally with the differential case 51, and the differential pinion gear 53 and the differential side gear 54 that are provided inside the differential case 51. An engagement part between the differential pinion gear 53 and the differential side gear 54 is a lubrication-needing site serving as the third supply destination C of the supply oil passage 100. The differential case 51 has boss parts 51a, 51b provided on both end sides in the axial direction, and is rotatably supported by the case 2 via the differential bearing 55 that is a rolling bearing. The differential bearing 55 includes a first differential bearing 55A attached to an outer peripheral part of one boss part 51a, and a second differential bearing 55B attached to an outer peripheral part of the other boss part 51b. The first differential bearing 55A is a lubrication-needing site serving as the first supply destination A of the supply oil passage 100, and is located outside the differential case 51. In the example illustrated in FIG. 3, the first differential bearing 55A is provided at a position close to a smaller-diameter-side opening of the baffle plate 10.

The counter gear mechanism 4 includes a hollow countershaft 41 disposed on the second axis $O_2$, a counter driven gear 42 that rotates integrally with the countershaft 41, and a counter drive gear 43. The countershaft 41 is rotatably supported by the case 2 via a counter bearing 44 that is a rolling bearing. The counter bearing 44 is included in a lubrication-needing site serving as the second supply destination B of the supply oil passage 100, that is, a lubrication-needing site on a separate shaft (the second shaft $R_2$ side). The counter driven gear 42 meshes with the output gear (not illustrated) of the transmission 3. The counter drive gear 43 meshes with the differential ring gear 52. The gear engagement parts are also included in the lubrication-needing site on the second shaft $R_2$ side. In the example illustrated in FIG. 3, the second discharge port 162 of the baffle plate 10 opens toward the inside of the countershaft 41, and supplies oil to the counter gear mechanism 4 that is the second supply destination B.

3. Structure of Baffle Plate

Figure 4:
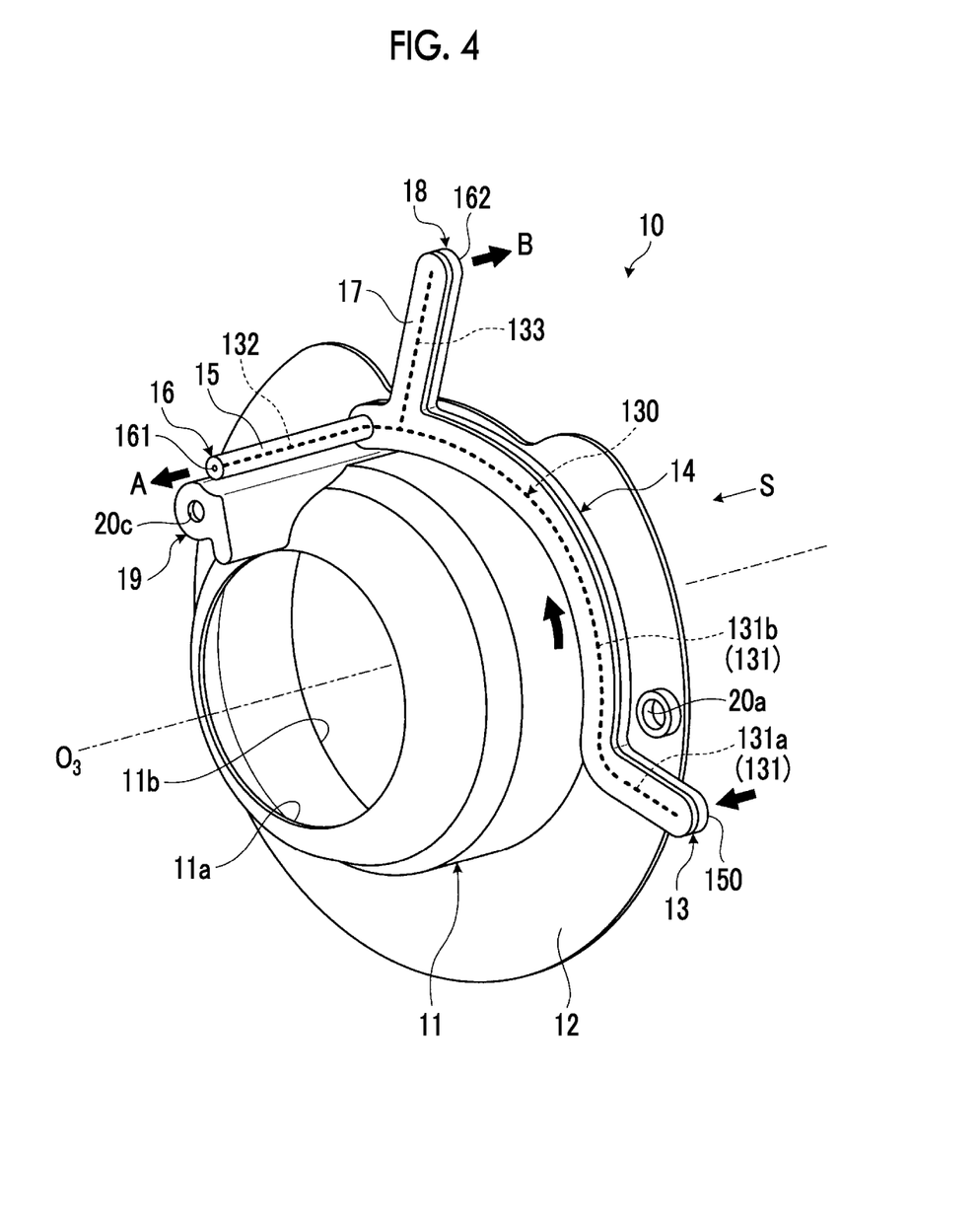
FIG. 4 is a perspective view schematically illustrating the baffle plate of the first embodiment.
Figure 5:
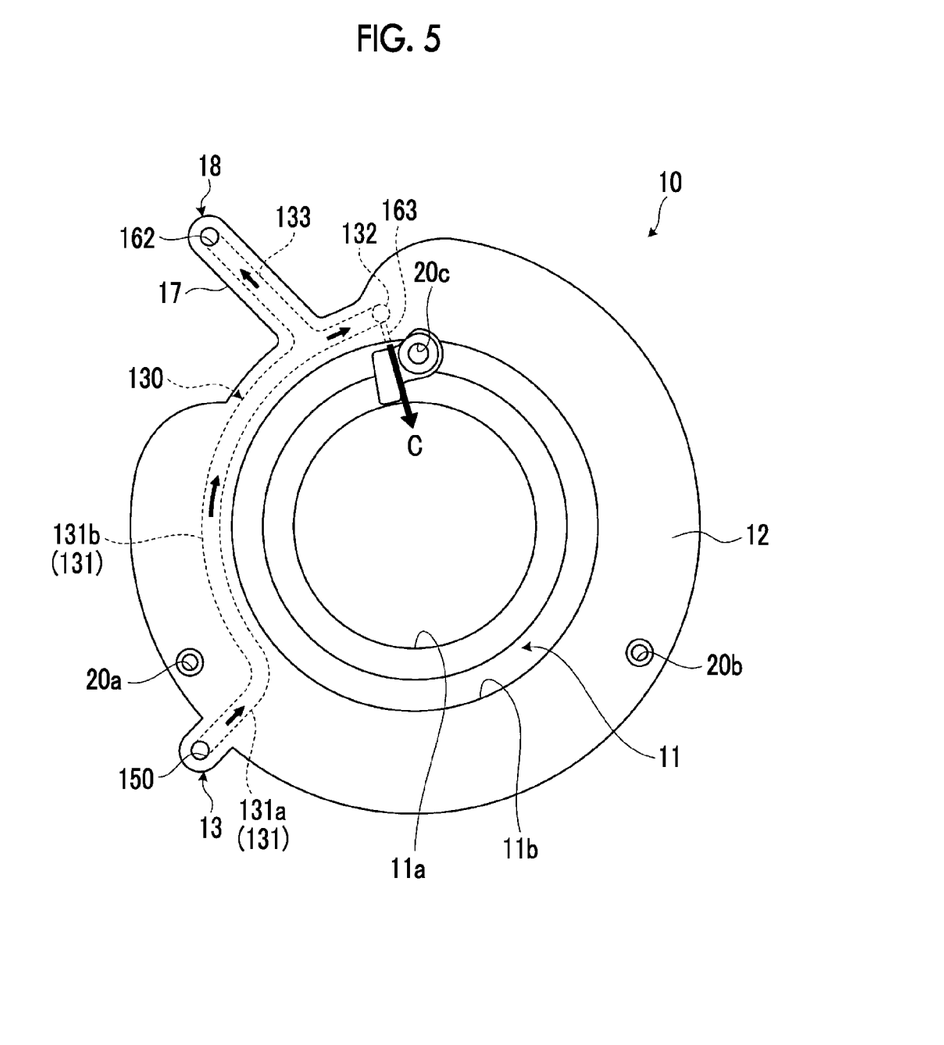
FIG. 5 is a plan view schematically illustrating the baffle plate as seen from an S direction of FIG. 4.

The structure of the baffle plate 10 will be described in detail with reference to FIGS. 4 and 5. FIG. 4 is a perspective view schematically illustrating the baffle plate 10 of the first embodiment. FIG. 5 is a plan view schematically illustrating the baffle plate 10 as seen from an S direction of FIG. 4. In addition, here, "the axial direction of the third axis $O_3$" is simply described as an "axial direction", and is described as a radial direction and a circumferential direction with the third axis $O_3$ as a reference.

The baffle plate 10 is a plate-shaped member made of resin and is integrally molded by injection molding as a whole. During the injection molding of the baffle plate 10, the plate oil passage 130 is formed inside the baffle plate 10.

In the injection molding, molten resin is filled into a space within a mold (cavity) and is solidified by cooling the resin within the cavity. In that case, since the temperature of the mold is lower than the temperature of the molten resin, the molten resin begins to be solidified after the temperature thereof drops from a portion (surface) that comes in contact with the mold. That is, during the injection molding of the baffle plate 10, the portion of the resin within the cavity, which comes in contacts with the mold, is temporarily solidified to form a surface-solidified layer. However, a state where the inside (an inner portion not in contact with the mold) of the surface-solidified layer is not solidified is brought about. In this state, gas (for example, air), water, or the like is sent into the inside of the resin that is not solidified inside the surface-solidified layer, and the molten resin surrounded by the surface-solidified layer is removed to the outside of the mold. As a result, a cavity surrounded by the surface-solidified layer is formed inside the resin. The cavity serves as the plate oil passage 130. The plate oil passage 130 is formed inside the baffle plate 10 by the method.

The plate oil passage 130 includes a first oil passage 131 that communicates with the supply port 150, a second oil passage 132 that communicates with the first discharge port 161, and a third oil passage 133 that communicates with the second discharge port 162. The first oil passage 131 includes an introduction oil passage 131a on the upstream side, and a main oil passage 131b on the downstream side. Additionally, in the plate oil passage 130, the first oil passage 131 branches to the second oil passage 132 and the third oil passage 133 from the upstream side toward the downstream side.

As illustrated in FIGS. 4 and 5, a tubular part 11, a flange part 12, a supply part 13, a first oil passage forming part 14, a second oil passage forming part 15, a first discharge part 16, a third oil passage forming part 17, a second discharge part 18, and a fixing part 19 are formed in the baffle plate 10.

The tubular part 11 is formed in a dome shape that opens on both sides in a height direction (axial direction). The tubular part 11 is provided with a first opening 11a opening to a top side in the dome shape and a second opening 11b opening to a bottom side in the dome shape. Both the openings 11a, 11b are formed in a circular shape, and the first opening 11a has a smaller diameter than the second opening 11b. That is, the tubular part 11 is reduced in diameter with a plurality of steps or gradually from the second opening 11b on the bottom side in the dome shape toward the first opening 11a on the top side in the dome shape. In a state where the baffle plate 10 is attached to the case 2, the tubular part 11 functions as a partition wall that restricts the flow of oil between the case 2 and a lubrication-needing site (for example, the differential gear mechanism 5).

The flange part 12 is a fixing part attached to the case 2, and is a positioning part of the baffle plate 10. As illustrated in FIGS. 4 and 5, the flange part 12 protrudes radially outwardly from the second opening 11b, and extends in the circumferential direction. A first bolt hole 20a and a second bolt hole 20b are provided at positions with a predetermined spacing from each other in the circumferential direction in the flange part 12. Bolts for fixing the baffle plate 10 to the case 2 are threadedly engaged with the bolt holes 20a, 20b.

The supply part 13 is a portion to which the supply port 150 opens. As illustrated in FIG. 4, the supply part 13 is a flat plate part that protrudes radially outwardly from the flange part 12, and the inside thereof is formed in a hollow shape. The height (axial direction length) of the supply part 13 is larger than the plate thickness of the flange part 12. As illustrated in FIG. 5, the supply port 150 opens to the surface of the supply part 13 on the other side in the axial direction. Additionally, a direction in which the supply port 150 opens is a direction opposite in the axial direction to a direction in which the first discharge port 161 opens, and is the same direction in the axial direction as a direction in which the second discharge port 162 opens. In a case where the baffle plate 10 is attached to the case 2, the supply part 13 is connected to the case 2 and communicates with the case oil passage 140.

The first oil passage forming part 14 is a portion that forms the first oil passage 131. As illustrated in FIGS. 4 and 5, the first oil passage forming part 14 includes a main portion that extends in the circumferential direction on a bottom side of the tubular part 11, and an introduction portion that extends radially outwardly from an end of the main portion. The supply part 13 is provided on a tip side (radial outer side) of the introduction portion.

The second oil passage forming part 15 is a portion that forms the second oil passage 132. As illustrated in FIG. 4, the second oil passage forming part 15 is a tubular protruding part that is formed in series with the first oil passage forming part 14, and protrudes in the axial direction from the flange part 12 toward the first opening 11a side. An internal space of the second oil passage forming part 15 constitutes the second oil passage 132. The first discharge part 16 is provided at a tip part of the second oil passage forming part 15.

The first discharge part 16 is a portion to which the first discharge port 161 opens. As illustrated in FIG. 4, the first discharge port 161 is provided at a tip part of the second oil passage forming part 15, and opens toward the one side in the axial direction. That is, the first discharge part 16 is a tip part of the second oil passage forming part 15. In a case where the baffle plate 10 is attached to the case 2, the first discharge port 161 is disposed at a position where oil is supplied to the first supply destination A.

The third oil passage forming part 17 is a portion that forms the third oil passage 133. As illustrated in FIGS. 4 and 5, the third oil passage forming part 17 is a linear flat plate part, and extends radially outwardly from the first oil passage forming part 14. Additionally, the inside of the third oil passage forming part 17 is formed in a hollow shape. An internal space of the third oil passage forming part 17 constitutes the third oil passage 133. The second discharge part 18 is provided on a tip side (radial outer side) of the third oil passage forming part 17.

The second discharge part 18 is a portion to which the second discharge port 162 opens. As illustrated in FIG. 5, the second discharge part 18 is constituted of a portion on the tip side (radial outer side) in the third oil passage forming part 17. The second discharge port 162 opens to the surface of the third oil passage forming part 17 on the other side in the axial direction. Additionally, a direction in which the second discharge port 162 opens is on the other side in the axial direction, that is, a direction opposite in the axial direction to the first discharge port 161. In a case where the baffle plate 10 is attached to the case 2, the second discharge port 162 is disposed at a position where oil is supplied to the second supply destination B. For example, the second discharge part 18 is disposed such that the second discharge port 162 opens toward the inside of a countershaft 41.

The fixing part 19 is a portion that is fastened to the case 2 with a bolt. As illustrated in FIG. 4, the fixing part 19 has a shape that protrudes in parallel with the second oil passage forming part 15, and a tip part thereof is provided with a third bolt hole 20c. A bolt for fixing the baffle plate 10 to the case 2 is threadedly engaged with the third bolt hole 20c.

Moreover, as illustrated by a dashed line in FIG. 5, a through-hole 163, which opens from the second oil passage 132 toward the inside of the tubular part 11, is formed in the baffle plate 10. The through-hole 163 functions as a discharge port (third discharge port) that discharges the oil within the plate oil passage 130, and supplies oil to the differential pinion gear 53 and the differential side gear 54 that are the third supply destination C. That is, the plate oil passage 130 branches to an oil passage that leads from the supply port 150 to the first discharge port 161, an oil passage that leads from the supply port 150 to the second discharge port 162, and an oil passage that leads from the supply port 150 to the through-hole 163.

In addition, the shape of the supply part 13 and the second discharge part 18 are not limited to that of the flat plate part. Both the supply part 13 and the second discharge part 18 may be formed in a cylindrical shape that extends in the axial direction. In this case, the supply part 13 has a tip part that protrudes axially outward further than the second opening 11b, and has the supply port 150 opening to the tip part thereof. In this case, the second discharge part 18 has a tip part that protrudes axially outward further than the second opening 11b, and has the second discharge port 162 opening to the tip part thereof. The tip part of the supply part 13 and the tip part of the second discharge part 18 protrude in the same direction in the axial direction.

4. Flow of Oil

Here, the flow of oil by the plate oil passage 130 will be described. The oil, which has flowed into the plate oil passage 130 from the supply port 150, flows through the introduction oil passage 131a of the first oil passage 131 radially inward. Then, the oil, which has flowed into the main oil passage 131b from the introduction oil passage 131a of the first oil passage 131, flows in the circumferential direction of the baffle plate 10. Since the baffle plate 10 is attached to the inner wall of the case 2 around the oil supply destination, the oil, which flows through the first oil passage 131, flows in the circumferential direction around the oil supply destination. Moreover, the oil, which flows through the main oil passage 131b, branches and flows to the second oil passage 132 side and the third oil passage 133 side in a branching position between the first oil passage 131 and the third oil passage 133.

The oil, which has flowed to the second oil passage 132 side from the branching position, flows into the second oil passage 132 from the first oil passage 131. Then, the oil, which has flowed into the second oil passage 132, is discharged from the first discharge port 161, or is discharged from the through-hole 163 that is the third discharge port. On the other hand, the oil, which has flowed from the branching position to the third oil passage 133 side, flows through the third oil passage 133 radially outward, and is discharged from the second discharge port 162.

Then, the oil discharged from the first discharge port 161 flows toward the first differential bearing 55A of the first supply destination A located outside the baffle plate 10. The oil discharged from the second discharge port 162 flows into the inside of the countershaft 41 included in the counter gear mechanism 4 of the second supply destination B located on the separate shaft. Since the first discharge port 161 and the second discharge port 162 open opposite to each other in the axial direction, the plate oil passage 130 can allow oil to be discharged in different directions in the axial direction. Additionally, the oil discharged from the through-hole 163, which is the third discharge port, flows toward the differential pinion gear 53 and the differential side gear 54 of the third supply destination C located inside the tubular part 11.

In this way, by providing the baffle plate 10 with the plate oil passage 130 common to the oil supply destinations and providing the first discharge port 161, the second discharge port 162, and the through-hole 163 that is the third discharge port in respective different lubrication-needing sites, lubricating oil can be easily supplied to lubrication-needing sites that run short of the lubricating oil. Accordingly, the number of oil passages can be reduced while compensating for the shortage of lubricating oil in the lubrication-needing sites. For that reason, the manufacturing costs of the power transmission device 1 can be suppressed.

As described above, in the oil passage structure of the first embodiment, the plate oil passage 130 that constitutes a portion of the supply oil passage 100 is formed in the baffle plate 10 attached to the inner wall of the case 2 around the oil supply destination. The plate oil passage 130 extends in the circumferential direction around the oil supply destination, and communicates with the discharge ports 161, 162 for supplying oil to the oil supply destination. For that reason, oil can be pumped to the oil supply destinations using the plate oil passage 130 that extends in the circumferential direction around the oil supply destination. Accordingly, the pressure loss of oil caused by the oil passage shape can be reduced. Additionally, it is possible to shorten the oil passage length of the supply oil passage 100, and the pressure loss of oil caused by the oil passage length can also be reduced. Also, the load of the mechanical oil pump 6 can be reduced by reducing the pressure loss in the supply oil passage 100. Moreover, since supply pipes to be disposed inside the case 2 can be reduced, the number of parts can be reduced, and the manufacturing costs can be reduced. In addition, the case 2 can be reduced in weight, that is, the power transmission device 1 can be reduced in weight. Accordingly, the fuel efficiency of a vehicle on which the power transmission device 1 is mounted can be improved.

In addition, the baffle plate 10 of the first embodiment is integrally molded by injection molding as a whole. During the injection molding of the baffle plate 10, the plate oil passage 130 can be formed inside the baffle plate 10. Accordingly, the number of parts can be reduced compared to a case where a baffle plate is integrated by combining a plurality of members together, and the manufacturing costs can be reduced.

Modification Example of First Embodiment

Figure 6:
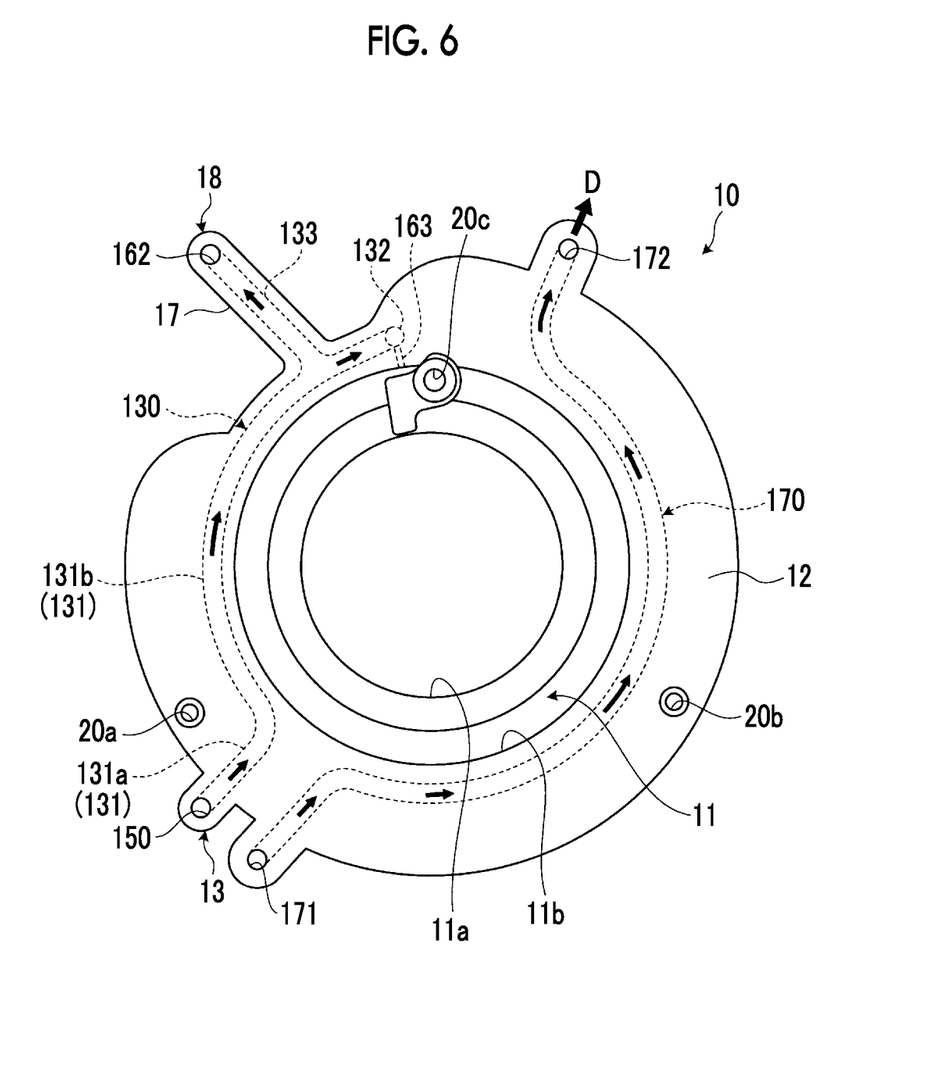
FIG. 6 is a plan view for illustrating plate oil passages in a modification example of the first embodiment.

As a modification example of a first embodiment, the baffle plate 10 may be provided with a plurality of independent plate oil passages. As an example of the modification example, a baffle plate 10 in which two independent plate oil passages are provided is illustrated in FIG. 6. In addition, in the description of the modification example, the description of the same components as those in the first embodiment will be omitted, and the reference signs of the components will be used.

FIG. 6 is a plan view for illustrating the plate oil passages in the modification example of the first embodiment. As illustrated in FIG. 6, a second plate oil passage 170 is provided in the baffle plate 10 of the modification example separately from the plate oil passage 130. Moreover, a second supply port 171 and a fourth discharge port 172 are formed in the baffle plate 10. The oil supplied from the second supply port 171 flows into the second plate oil passage 170, and the oil is discharged from the fourth discharge port 172. The second plate oil passage 170 is formed in a portion of the flange part 12 where the plate oil passage 130 is not provided, and extends in the circumferential direction of the flange part 12. The fourth discharge port 172 is provided at a position where oil is supplied to a fourth supply destination D. The oil supply destinations (the first oil supply destination A, the second oil supply destination B, and the third oil supply destination C) of the plate oil passage 130 and the oil supply destination (the fourth oil supply destination D) of the second plate oil passage 170 may be either lubrication-needing sites or hydraulic actuators. For example, oil can be supplied to lubrication-needing sites (the first supply destination A, the second supply destination B, and the third supply destination C) via the plate oil passage 130, and hydraulic pressure can be supplied to a hydraulic actuator (the fourth supply destination D) via the second plate oil passage 170. In the baffle plate 10 disposed near the differential case 51, oil with different hydraulic pressures can be supplied to different oil supply destinations by causing oil to flow to the two plate oil passages 130, 170, respectively. In addition, an arrow from the fourth discharge port 172 to the fourth supply destination D illustrated in FIG. 6 is not for indicating the direction where oil is discharged from the fourth discharge port 172, that is, the position of the fourth supply destination D, and is for specifying a supply destination of oil discharged from the fourth discharge port 172.

Second Embodiment

5. Structure of Baffle Plate in Second Embodiment

Next, an oil passage structure for a power transmission device in a second embodiment will be described with reference to FIG. 7. In the second embodiment, the baffle plate 10 is formed by integrating separately molded members with each other, unlike the first embodiment. In addition, in the description, the description of the same components as those of the first embodiment will be omitted, and the reference signs of the components will be used.

Figure 7:
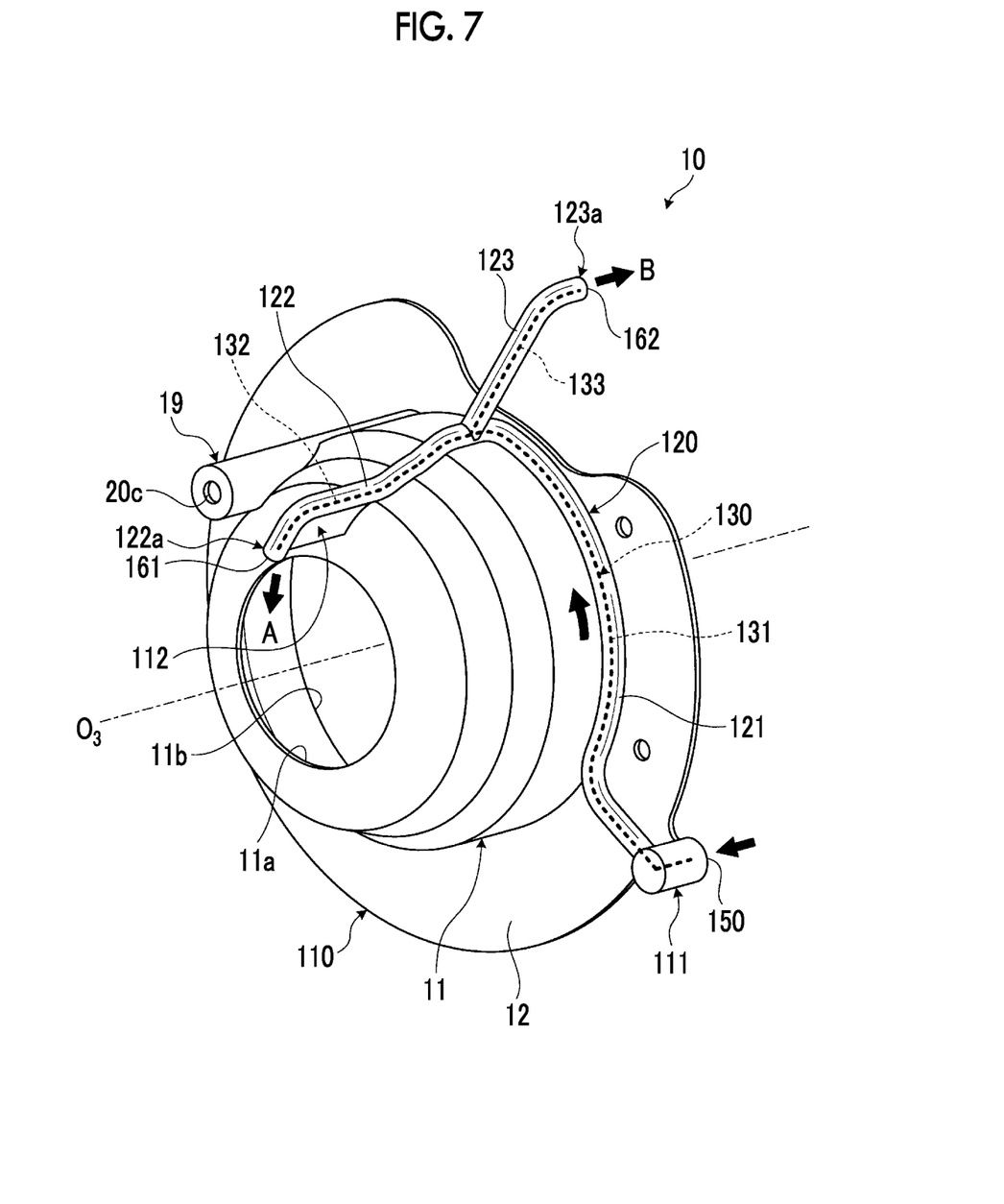
FIG. 7 is a perspective view schematically illustrating a baffle plate of a second embodiment.

FIG. 7 is a perspective view schematically illustrating the baffle plate 10 in the second embodiment. As illustrated in FIG. 7, the baffle plate 10 of the second embodiment has a structure in which a plate body 110 and a tubular member 120 are integrated with each other.

5-1. Plate Body

The plate body 110 is a plate-shaped member made of resin and is a member (first member) that constitutes a main constituent of the baffle plate 10. For example, the plate body 110 is integrally molded by the injection molding. The tubular part 11, the flange part 12, the fixing part 19, a supply part 111, and a support part 112 are formed in the plate body 110.

The supply part 111 is a portion to which the supply port 150 opens. As illustrated in FIG. 7, the supply part 111 is a bottomed cylindrical hollow part provided at an outer peripheral part of the flange part 12, and protrudes to both sides of the flange part 12 in the axial direction. The supply port 150 opens to the surface of the supply part 111 on one side in the axial direction (not illustrated in FIG. 7). For example, the radial position of the supply port 150 is radially outward of the outer peripheral part of the flange part 12. Moreover, the tubular member 120 is connected to a side surface part of the supply part 111. Accordingly, the supply port 150 and the internal space of the tubular member 120 communicate with each other.

The support part 112 is a portion that supports the tubular member 120. The support part 112 supports the tubular member 120 such that the oil within the plate oil passage 130 is discharged toward a desired position (oil supply destination). As illustrated in FIG. 7, the support part 112 is a flat plate part provided outside the tubular part 11, and extends in the radial direction and the axial direction. A tip part of the support part 112 protrudes to the outside of the first opening 11a in the axial direction. That is, a side surface of the support part 112 protrudes in the axial direction from the tubular part 11, and extends in the radial direction axially further outward than the first opening 11a. The first discharge part of the tubular member 120 is integrated with the tip part of the support part 112.

5-2. Tubular Member

The tubular member 120 is a tubular member made of resin, and is a member (second member) that constitutes the plate oil passage 130. As illustrated in FIG. 7, the tubular member 120 has a shape that is connected in an elongated tubular shape as a whole and is integrated with (fixed to) an outer surface of the plate body 110. For example, the tubular member 120 is integrated with the plate body 110 by welding, bonding, or the like. Accordingly, the plate oil passage 130 is formed integrally with the baffle plate 10. That is, since the tubular member 120 is a portion of the baffle plate 10, the plate oil passage 130 of the second embodiment can be called an oil passage that passes through the inside of the baffle plate 10. In detail, the plate oil passage 130 of the second embodiment is not an oil passage that passes through the inside of the plate body 110 and is an oil passage formed by the tubular member 120 that constitutes a portion of the baffle plate 10. The tubular member 120 includes a first oil passage forming part 121, a second oil passage forming part 122, and a third oil passage forming part 123.

The first oil passage forming part 121 is a tube portion that constitutes the first oil passage 131, and is integrated with an outer surface of the flange part 12. As illustrated in FIG. 7, the first oil passage forming part 121 includes an introduction portion that extends radially inwardly from the supply part 111, and a main portion that extends in the circumferential direction on the bottom side of the tubular part 11. A downstream portion of the first oil passage forming part 121 communicates with the second oil passage forming part 122.

The second oil passage forming part 122 is a tube portion that constitutes the second oil passage 132, and is integrated with an outer surface of the tubular part 11 and the side surface of the support part 112. As illustrated in FIG. 7, an upstream portion of the second oil passage forming part 122 is a portion that is integrated with the outer surface of the tubular part 11, and extends from the bottom side of the tubular part 11 toward the top side thereof (from the second opening 11b side to the first opening 11a side in the axial direction). A downstream portion of the second oil passage forming part 122 is a portion that is integrated with the side surface of the support part 112, and extends axially outward and extends radially inward further than the first opening 11a. The second oil passage forming part 122 has a downstream tip part 122a that faces a radial inner side. The first discharge port 161 opens to the downstream tip part 122a. The first discharge port 161 opens radially inward. Then, the oil, which has flowed through the second oil passage 132, is discharged radially inwardly from the first discharge port 161. Accordingly, oil can be directly supplied from the first discharge port 161 to the first supply destination A.

The third oil passage forming part 123 is a tube portion that constitutes the third oil passage 133, and extends radially outwardly from the second oil passage forming part 122. An upstream end part of the third oil passage forming part 123 is integrated with the upstream portion of the second oil passage forming part 122. Accordingly, the second oil passage 132 and the third oil passage 133 communicate with each other. Additionally, a downstream portion of the third oil passage forming part 123 has a shape that is curved in the axial direction from the radial direction, and extends in the axial direction. That is, the third oil passage forming part 123 has a downstream tip part 123a that faces the axial direction. The second discharge port 162 opens to the downstream tip part 123a. In addition, a direction in which the downstream tip part 123a extends is the same direction in the axial direction as a direction in which the supply port 150 of the supply part 111 opens.

As described above, in the oil passage structure of the second embodiment, the plate oil passage 130 is constituted of the tubular member 120. Thus, a flow passage cross-section of the plate oil passage 130 has a circular shape. Accordingly, when oil flows through the plate oil passage 130, the pressure loss of oil can be reduced. Additionally, since the tubular member 120 is integrated with the plate body 110, a space for installing the related-art supply pipe can be reduced. Moreover, the baffle plate 10 with an oil passage can be formed by a manufacturing method different from the first embodiment.

Modification Example of Second Embodiment

In the baffle plate 10 of the second embodiment, the plate body 110 and the tubular member 120 are not limited to a case where both are made of resin, and at least one member may be made of resin. For example, the plate body 110 may be made of metal, and the tubular member 120 may be made of resin. Alternatively, the plate body 110 may be made of resin, and the tubular member 120 may be made of metal. In this way, even in a case where one of the plate body 110 and the tubular member 120 is made of metal, and the other is made of resin, it is possible to integrate the plate body 110 and the tubular member 120 to each other.

In addition, the disclosure is not limited to the embodiment, and changes can be appropriately made without departing from the object of the disclosure.

The arrangement of the baffle plate 10 is not limited to a case where the baffle plate is provided between the case 2 and the differential case 51 on the third axis $O_3$. Although not illustrated, the baffle plate 10 may be provided on the second axis $O_2$ (on the second shaft $R_2$) that is provided with the countershaft 41.

Moreover, the power transmission device 1 is not limited to a case where the power transmission device is mounted on the FF vehicle, and may be mounted on a rear-engine, rear-wheel-drive type vehicle (RR vehicle). Moreover, the oil passage structure can be applied to a power transmission device in which a power source (for example, an electric motor) different from the engine and the counter gear mechanism are provided on the rear side. In a case where the oil passage structure is applied to the rear-engine, rear-wheel-drive type vehicle, the first discharge port 161 supplies oil to a differential gear mechanism on the rear side, and the second discharge port 162 supplies oil to a counter gear mechanism on the rear side. Alternatively, the oil passage structure can be applied to a power transmission device mounted on a front-engine, rear-wheel-drive type vehicle (FR vehicle). In a case where the oil passage structure is applied to the FR vehicle, the baffle plate 10 is disposed so as to cover the differential gear mechanism on the rear side. Then, oil is supplied from the first discharge port 161 to a differential bearing on the rear side, and oil is supplied from the through-hole 163 to a differential pinion gear and a differential side gear on the rear side.

Additionally, in the supply oil passage 100, the oil supply destinations passing through the baffle plate 10 are not limited to the lubrication-needing portions, and may be a hydraulic actuator (not illustrated) provided in the power transmission device 1. That is, oil (hydraulic pressure) can be supplied to the hydraulic actuator via the plate oil passage 130 of the baffle plate 10. For example, a hydraulic actuator provided in a clutch or and a brake of the power transmission device 1 is used as the oil supply destination.

Moreover, the oil supply destinations in the plate oil passage 130 are not limited to a case where all the oil supply destinations are lubrication-needing portions. That is, both of a lubrication-needing portion and a hydraulic actuator may be included in the oil supply destinations passing through the plate oil passage 130. For example, the oil pumped through the plate oil passage 130 is supplied from the first discharge port 161 to a lubrication-needing portion that is the first supply destination A, and is supplied from the second discharge port 162 to a hydraulic actuator that is the second supply destination B. That is, one of the first discharge port 161 and the second discharge port 162 is provided at a position where oil is supplied to the lubrication-needing portion, and the other is provided at a position where oil is supplied to the hydraulic actuator.

Additionally, the oil supply source may be an oil pump and may be an electric oil pump without being limited to the mechanical oil pump 6. Moreover, the arrangement of the electric oil pump is also not particularly limited.

What is claimed is:

1. An oil passage structure for a power transmission device, the oil passage structure comprising:
   a case provided to accommodate the power transmission device;
   a baffle plate attached to an inner wall of the case;
   an oil pump; and
   a supply oil passage through which oil is pumped from the oil pump to an oil supply destination via the baffle plate, the baffle plate having a plate oil passage, a supply port and a discharge port, the plate oil passage being an oil passage that constitutes a portion of the supply oil passage, the supply port being configured to allow the oil discharged from the oil pump to flow into the plate oil passage through the supply port, and the discharge port being configured to allow the oil supplied to the oil supply destination, to be discharged from the plate oil passage through the discharge port, wherein:
   the oil supply destination includes a first oil supply destination and a second oil supply destination at different positions inside the case;
   the discharge port includes a first discharge port that allows the oil supplied to the first oil supply destination to be discharged through the first discharge port, and a second discharge port that allows the oil supplied to the second oil supply destination to be discharged through the second discharge port; and
   the plate oil passage branches to a second oil passage that leads from the supply port to the first discharge port, and a third oil passage that leads from the supply port to the second discharge port.

2. The oil passage structure according to claim 1, wherein:
   the plate oil passage is an oil passage that allows the oil to be supplied through the oil passage to a lubrication-needing portion where lubrication by the oil is needed in the power transmission device;
   the first oil supply destination is a constituent element of a differential gear mechanism included in the power transmission device;
   the second oil supply destination is a constituent element separate from the differential gear mechanism in the power transmission device;
   the first discharge port is provided at a position where oil is directly supplied to the first supply destination; and
   the second discharge port is provided at a position where oil is directly supplied to the second supply destination.

3. The oil passage structure according to claim 2, wherein:
   the oil supply destination further includes a third oil supply destination that is a differential pinion gear and a differential side gear that constitute the differential gear mechanism;
   the discharge port further includes a third discharge port provided at a position where oil is directly supplied to the third oil supply destination;
   the plate oil passage branches to a second oil passage that leads from the supply port to the first discharge port, and a fourth oil passage that leads from the supply port to the third discharge port;
   the first supplied oil portion is a differential bearing that supports a differential case accommodating the differential pinion gear and the differential side gear on the case; and the baffle plate is disposed so as to cover the differential case.

4. The oil passage structure according to claim 1, wherein:
the plate oil passage is a lubricating oil passage that allows oil to be supplied through the lubricating oil passage to a constituent element of a differential gear mechanism included in the power transmission device, and an oil passage that allows hydraulic pressure of oil to be supplied through the oil passage to a hydraulic actuator included in the power transmission device;
the baffle plate is provided on an axis where the differential gear mechanism is disposed;
the first oil supply destination is a constituent element of the differential gear mechanism;
the second oil supply destination is the hydraulic actuator; and
the first discharge port is provided at a position where oil is directly supplied to the first supply destination.

5. The oil passage structure according to claim 1, wherein a direction in which the supply port opens is a direction opposite to a direction in which the first discharge port opens.

6. The oil passage structure according to claim 4, wherein a direction in which the supply port opens is the same as a direction in which the second discharge port opens.

7. The oil passage structure according to claim 1, wherein the plate oil passage is an oil passage that passes through an inside of the baffle plate.

8. The oil passage structure according to claim 1, wherein the baffle plate has a second plate oil passage that is an oil passage independent from the plate oil passage, the second plate oil passage is configured to allow oil to be pumped through the second plate oil passage to an oil supply destination different from the oil supply destination via the plate oil passage.

9. The oil passage structure according to claim 1, wherein:
the baffle plate includes a plate-shaped plate body and a tubular member integrated with the plate body; and
the plate oil passage is an oil passage formed by the tubular member.

10. An oil passage structure for a power transmission device, the oil passage structure comprising:
a case provided to accommodate the power transmission device;
a baffle plate attached to an inner wall of the case;
an oil pump; and
a supply oil passage through which oil is pumped from the oil pump to an oil supply destination via the baffle plate, the baffle plate having a plate oil passage, a supply port and a discharge port, the plate oil passage being an oil passage that constitutes a portion of the supply oil passage, the supply port being configured to allow the oil discharged from the oil pump to flow into the plate oil passage through the supply port, and the discharge port being configured to allow the oil supplied to the oil supply destination, to be discharged from the plate oil passage through the discharge port, wherein:
the power transmission device includes a transmission, a counter gear mechanism, and a differential gear mechanism;
the oil pump is a mechanical oil pump which is driven by engine torque transmitted to the mechanical oil pump via the power transmission device; and
the plate oil passage is provided so as to pass between a rotary shaft of the transmission and a rotary shaft of the differential gear mechanism.

11. An oil passage structure for a power transmission device, the oil passage structure comprising:
a case provided to accommodate the power transmission device;
a baffle plate attached to an inner wall of the case;
an oil pump; and
a supply oil passage through which oil is pumped from the oil pump to an oil supply destination via the baffle plate, the baffle plate having a plate oil passage, a supply port and a discharge port, the plate oil passage being an oil passage that constitutes a portion of the supply oil passage, the supply port being configured to allow the oil discharged from the oil pump to flow into the plate oil passage through the supply port, and the discharge port being configured to allow the oil supplied to the oil supply destination, to be discharged from the plate oil passage through the discharge port, wherein:
the power transmission device includes a transmission, a counter gear mechanism, and a differential gear mechanism; and
the plate oil passage is provided so as to pass between a rotary shaft of the counter gear mechanism and a rotary shaft of the differential gear mechanism.

12. An oil passage structure for a power transmission device, the oil passage structure comprising:
a case provided to accommodate the power transmission device;
a baffle plate attached to an inner wall of the case;
an oil pump; and
a supply oil passage through which oil is pumped from the oil pump to an oil supply destination via the baffle plate, the baffle plate having a plate oil passage, a supply port and a discharge port, the plate oil passage being an oil passage that constitutes a portion of the supply oil passage, the supply port being configured to allow the oil discharged from the oil pump to flow into the plate oil passage through the supply port, and the discharge port being configured to allow the oil supplied to the oil supply destination, to be discharged from the plate oil passage through the discharge port, wherein:
the baffle plate has a tubular part, and a flange part that extends radially outwardly from the tubular part;
the plate oil passage extends in a circumferential direction of the baffle plate; and
the discharge port is provided at a position, which is different in the circumferential direction of the baffle plate from a position at which the supply port is provided, such that oil is supplied to the oil supply destination.

* * * * *